Patented June 6, 1933

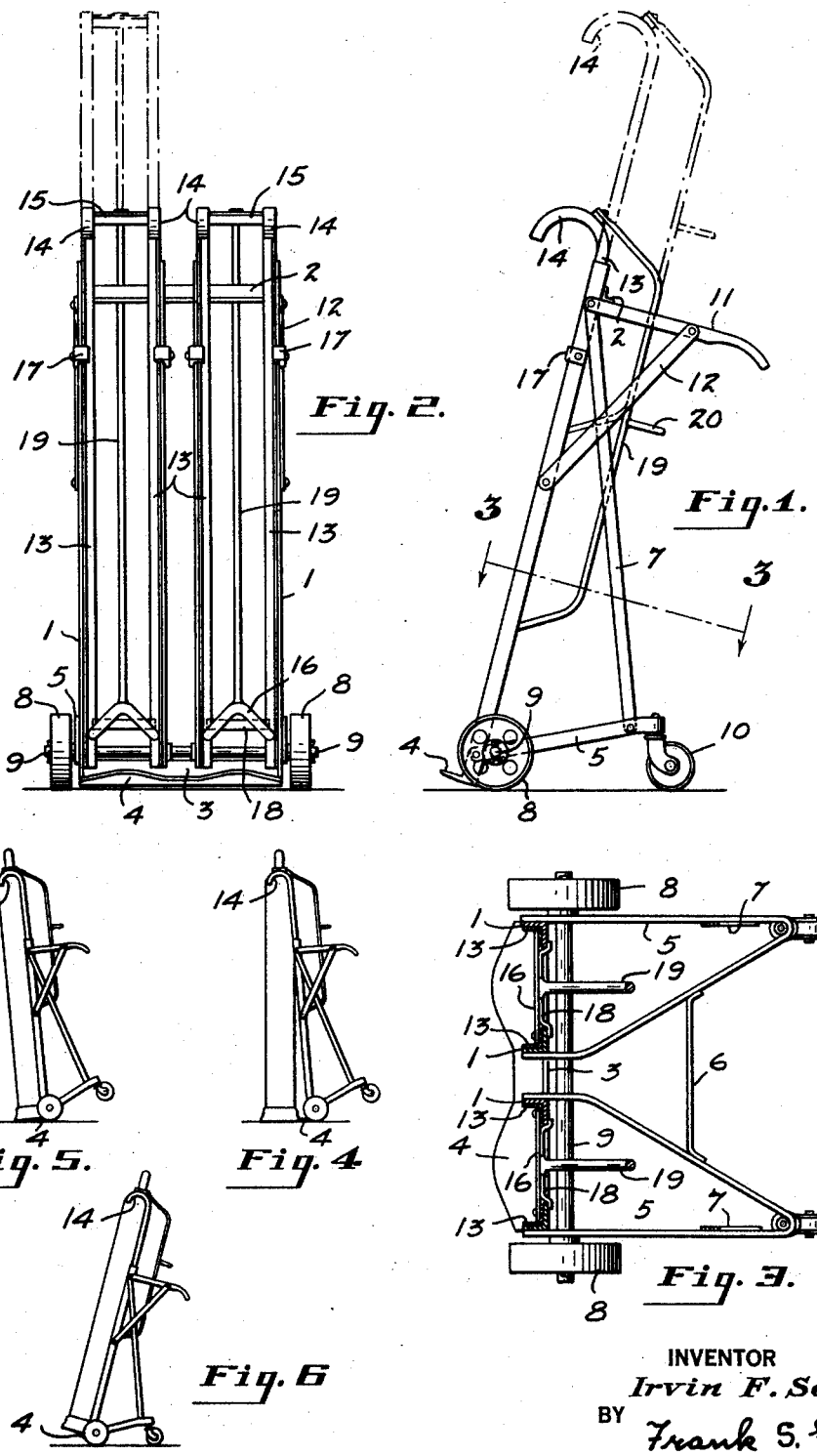

1,913,295

UNITED STATES PATENT OFFICE

IRVIN F. SCHRECK, OF EAST CLEVELAND, OHIO

TRUCK FOR CYLINDERS

Application filed June 21, 1932. Serial No. 618,430.

This invention relates to trucks and more particularly to trucks for handling elongated containers such as the metal tanks commonly employed for storing and transporting various gases.

The present invention has for its object to proved a truck for handling tanks or other containers of the character referred to which is so designed that heavy tanks or other similar containers may be picked up, transported and discharged with a minimum of muscular effort on the part of the operator.

More particularly it is the object of the invention to provide a dirigible truck which is provided with front and rear wheels so disposed as to support the entire load, which is provided with means for holding the containers in place on the truck and which is tiltable about its forward supporting wheels through a small angle so that the truck may be used as a lever to pick up tanks or containers from the floor and may be easily tilted with a load thereon to deposit the tanks upon the floor.

A further object of the invention is to provide a truck having retaining members engageable with the upper end of a tank or other container to hold the same against the body of the truck, and which is so mounted on its supporting wheels that the tank or other container may be tilted by tilting the truck body forwardly past a vertical position to enable the lifting flange of the truck to be entered beneath the bottom of a tank in picking a tank up from the floor, and to be withdrawn from beneath the bottom of a tank in transferring a tank from the truck onto the floor.

A further object of the invention is to provide a truck capable of simultaneously handling a plurality of tanks or similar containers.

With the above and other objects in view the invention may be said to comprise the device as illustrated in the accompanying drawing hereinafter described and particularly set forth in the appended claims together with such variations and modifications thereof as will be apparent to one skilled in the art to which the invention appertains.

Reference should be had to the accompanying drawing forming a part of this specification, in which:

Figure 1 is a side elevation of the truck embodying the invention;

Fig. 2 is a front elevation of the truck;

Fig. 3 is a section taken on the line indicated at 3—3 in Fig. 1;

Figs. 4, 5 and 6 are views illustrating the method of picking up a tank from the floor; Fig. 4 showing the retaining hooks in engagement with the top of the tank and the load supporting flange closely adjacent the bottom of the tank; Fig. 5 showing the tank and truck tilted forwardly past vertical position to elevate the bottom of the tank at its rear edge and the lifting flange positioned beneath the elevated edge of the tank bottom; and Fig. 6 showing the truck tilted back in transporting position with the tank supported thereon.

As shown in the accompanying drawing, the load supporting portion of the truck frame comprises parallel load supporting bars 1 which are disposed in nearly upright position, being rigidly connected by a cross bar 2 adjacent their upper ends and by a cross member 3 at their lower ends which is provided with a forwardly projecting load supporting flange 4. The bars 1 are arranged in pairs spaced apart the proper distance to provide a support or rest for the body of a tank or similar container. The truck may be provided with a single pair of bars 1 for handling a single tank, or with a plurality of pairs of bars for simultaneously carrying a plurality of tanks positioned side by side thereon. The truck herein illustrated is constructed to carry two tanks and has two pairs of supporting bars 1 arranged side by side. The truck frame has rearwardly projecting members 5, one attached to each pair of load supporting bars at the lower ends thereof. The members 5 are in the form of bars bent to substantially V-shape, each of which is attached at its ends to the lower ends of the load supporting bars 1 of a pair. The V-shaped members 5 are connected rearwardly of the bars 1 by cross bar 6 which provides a foot piece which may be utilized to push the bottom of the truck forwardly to enter the flange 4 beneath the bottom of a tank and to assist in tilting the truck to lift a tank off the floor. Braces 7 connect the rear end portions of the rearwardly extending members 5 with the upper end portions of bars 1 at opposite sides of the truck.

The truck frame is supported on main supporting wheels 8 which are axially alined and mounted adjacent opposite ends of the flange 4, being preferably mounted on a cross axle 9 which is journaled in the rearwardly extending frame members 5 closely adjacent the lower ends of the frame bars 1. Caster wheels 10 are mounted in the rear ends of the frame members 5 and are so positioned that when they rest on the floor the bars 1 are inclined rearwardly at a small angle to the vertical and the entire weight of the frame and load is carried by the wheels when the truck is in this position as shown in Figs. 1 and 6. Handles 11 are attached to the frame bars 1 at opposite sides of the frame adjacent their upper ends and project rearwardly from the frame bars, the handles 11 being also connected to the frame bars by inclined braces 12.

A bar 13 is telescopically mounted in each of the frame bars 1 and these bars are provided at their upper ends with forwardly projecting hooks 14. The two telescopic bars 13, mounted in each pair of frame bars 1, are connected at their upper ends by a cross bar 15 and at their lower ends by a cross bar 16.

The frame bars 1 and telescopic bars 13 may be in the form of angles and suitable means is provided for guiding the bars 13 in the bars 1. As shown in Figs. 1 and 2, clips 17 are attached to the frame bars 1 adjacent their upper ends and project inwardly over the forwardly projecting flanges of the bars 13. The lower ends of the bars 13 are retained within the bars 1 by means of a clip bar 18 attached to the lower cross bar 16 attached to bars 13 and having its ends projecting over the inwardly projecting flanges of the bars 1. Rearwardly bowed rods 19 are connected at their upper and lower ends to the cross bars 15 and 16 and are provided intermediate their ends with rearwardly projecting handles 20 by means of which either pair of telescopically mounted hook bars may be elevated to a position such that the hooks 14 may be engaged with the upper end of a tank. Since there is considerable variation in the height of gas tanks which may be handled by the truck, the bars 13 preferably extend substantially the full length of the frame bars 1 so that tanks may be handled which are considerably longer than the frame bars 1.

In picking up a tank from the floor the truck is pushed up to the tank, tilted forwardly to bring the frame bars to substantially vertical position, and the hook bars 13 are then lifted and the hooks 14 engaged with the upper end of the tank as shown in Fig. 4 of the drawing. The truck is then tilted forwardly past vertical position by lifting on the handles 11, tilting the tank and, after the rear edge of the bottom of the tank is elevated from the floor by the tilting of the tank the forwardly projecting flange 4 may be entered beneath the bottom of the tank by pushing forwardly on the lower portion of the truck by means of the foot piece 6, engaging the truck with the tank as shown in Fig. 5. The truck frame is then tilted back to load carrying position, lifting the tank off the floor as shown in Fig. 6, by pushing down on the handles 11 and with a foot upon the cross bar 6 if desired. In the load carrying position the tank is so supported that its center of gravity is disposed rearwardly of the front wheels and forwardly of the rear wheels and the truck may be pushed along the floor with the entire weight supported upon the supporting wheels. Since the rear supporting wheels are caster wheels the truck is easily steered and, since the truck frame provides a good leverage and the angle of movement is small, very little muscular effort is required to lift a heavy tank from the floor or to deposit the tank from the truck to the floor.

Furthermore, it is to be understood that the particular form of truck shown and described, and the particular procedure set forth, are presented for purposes of explanation and illustration and that various modifications of said truck and procedure can be made without departing from my invention as defined in the appended claims.

What I claim is:

1. A truck comprising a load supporting frame including a pair of parallel load supporting bars, a pair of bars telescopically connected, one to each of the load supporting bars and connected together for simultaneous sliding movement, the latter bars having forwardly projecting load engaging hooks at their upper ends, a load engaging flange at the lower ends of said supporting bars and coaxial supporting wheels carried by the frame adjacent the lower ends of the supporting bars.

2. A truck comprising a load supporting frame including a pair of parallel rearwardly inclined load supporting bars, a portion rigidly connected to the lower ends of said bars and extending rearwardly therefrom and a handle projecting rearwardly from said bars, bars telescopically connected to the load supporting bars and having load engaging hooks at their upper ends, a load engaging flange connected to the lower ends of said load supporting bars, axially alined main supporting wheels carried by the frame adjacent the lower ends of the load supporting bars, and a caster wheel carried by the rearwardly extending portion.

3. A truck comprising a supporting axle having wheels thereon, a frame including a pair of parallel load supporting bars, a forwardly projection load lifting member connecting the lower ends of the bars, a handle projecting rearwardly from the bars and a pair of load engaging hooks slidably mounted on the bars and connected for simultaneous movements longitudinally of the bars, said frame being secured adjacent the lower ends of the bars to the axle to fulcrum on the supporting wheels.

4. A truck comprising a frame having a base portion provided with a caster wheel at its rear end, an upright portion comprising parallel supporting bars attached to the forward end of the base portion, a handle projecting rearwardly from the upright portion, a load engaging flange projecting forwardly from the lower end of the upright portion, bars telescopically engaging the lead supporting bars and having forwardly projecting hooks at their upper ends, an axle connected to the base portion rearwardly of the lower ends of the load supporting bars, and supporting wheels on the axle.

5. A tank truck comprising a rigid frame having a pair of parallel, nearly upright, rearwardly inclined tank supporting bars, a base portion projecting rearwardly from the rear ends of said bars, a tank supporting flange projecting forwardly from the lower ends of said bars and a handle projecting rearwardly from the supporting bars, axially alined supporting wheels carried by the frame adjacent the lower ends of said supporting bars, a caster wheel carried by the rearwardly projecting base portion of the frame and hooks for engaging the top of a tank slidably mounted on the load supporting bars, the lower ends of the load supporting bars and the load engaging flange being so disposed with respect to the supporting wheels that they are clear of the floor when the caster wheel engages the floor and said frame may be tilted forwardly slightly past vertical position whereby a tank engaged by the hooks may be tilted and said flange inserted beneath the bottom thereof.

6. A tank truck comprising a rigid frame having a plurality of pairs of parallel, nearly upright, rearwardly inclined tank supporting bars, a rigid member extending rearwardly from the lower end of each pair of bars, a tank supporting flange extending across the lower ends of said bars and projecting forwardly and a pair of handle members extending rearwardly from said supporting bars, a plurality of pairs of hooks slidably mounted on the load supporting bars, the hooks of each pair being connected for simultaneous movement and being engageable with the top of a tank to hold the same to the supporting bars, axially alined supporting wheels carried by the frame adjacent the lower ends of the supporting bars, and caster wheels carried by the rearwardly extending members, said main supporting wheels being so positioned with respect to the lower ends of said supporting bars and flange that the bars and flange are clear of the floor when the caster wheels engage the floor and said frame may be tilted forwardly slightly past vertical position to tilt a tank or tanks engaged by the hooks and enter the flange beneath the same.

In testimony whereof I affix my signature.

IRVIN F. SCHRECK.